United States Patent [19]

Hwang et al.

[11] Patent Number: 5,723,542
[45] Date of Patent: Mar. 3, 1998

[54] HIGH FLOW, HIGH DUCTILITY POLY (ARYLENE SULFIDE) RESIN BLENDS

[75] Inventors: Chorng-Fure Robin Hwang, Cary, N.C.; James J. Scobbo, Jr., Guilderland; S. Bruce Brown, Schenectady, both of N.Y.

[73] Assignee: General Electric Company, Pittsfield, Mass.

[21] Appl. No.: 654,471

[22] Filed: May 28, 1996

Related U.S. Application Data

[63] Continuation-in-part of Ser. No. 288,518, Aug. 10, 1994, abandoned.

[51] Int. Cl.$^6$ .................. C08L 53/00; C08L 71/02
[52] U.S. Cl. ............................ 525/92 J; 525/187
[58] Field of Search ....................... 525/92 J, 187

[56] References Cited

U.S. PATENT DOCUMENTS

| | | |
|---|---|---|
| 3,354,129 | 11/1967 | Edmonds, Jr. et al. . |
| 3,354,757 | 11/1967 | Grimm et al. . |
| 3,919,177 | 11/1975 | Campbell . |
| 4,528,346 | 7/1985 | Sugie et al. . |
| 4,681,915 | 7/1987 | Bates et al. . |
| 4,769,424 | 9/1988 | Takekoshi et al. . |
| 4,889,893 | 12/1989 | Kobayashi et al. . |
| 5,122,578 | 6/1992 | Han et al. . |

FOREIGN PATENT DOCUMENTS

| | | |
|---|---|---|
| 0104543 | 4/1984 | European Pat. Off. . |
| 0228268 | 7/1987 | European Pat. Off. . |
| 0341422 | 11/1989 | European Pat. Off. . |
| 0345094 | 12/1989 | European Pat. Off. . |
| 0368413 | 5/1990 | European Pat. Off. . |
| 02252761 | 10/1990 | Japan . |
| 04198268 | 7/1992 | Japan . |

*Primary Examiner*—Helen Lee

[57] ABSTRACT

A poly(arylene sulfide) resin composition is provided which contains a low molecular weight poly(arylene sulfide) resin, a high molecular weight poly(arylene sulfide) resin and impact modifiers. The compositions exhibit enhanced levels of low temperature impact properties. The compositions are useful in the manufacture of molded articles. Preferably the compositions utilize an elastomeric block copolymer as the impact modifier, and further comprise an epoxy functional alpha-olefin elastomer.

8 Claims, No Drawings

HIGH FLOW, HIGH DUCTILITY POLY (ARYLENE SULFIDE) RESIN BLENDS

This application is a continuation in part of Ser. No. 08/288,518, filed Aug. 10, 1994, now abandoned.

BACKGROUND OF THE INVENTION

1. Field of the Invention

The present invention relates to impact modified poly (arylene sulfide) resin compositions, and more particularly relates to impact modified poly(arylene sulfide) resin compositions comprising blends of poly(arylene sulfide) resins.

2. Description of the Related Art

Impact modified poly(arylene sulfide) resin compositions are generally known. Compositions utilizing a high molecular weight poly(arylene sulfide) resin as the sole poly (arylene sulfide) resin generally lack desired levels of flowability and have poor low temperature impact properties. Compositions utilizing a low molecular weight poly (arylene sulfide) resin as the sole poly(arylene sulfide) resin lack the desired levels of certain properties, for example, impact properties at low temperatures. Compositions utilizing a mid-molecular weight poly(arylene sulfide) resin can exhibit higher than desired melt viscosities.

Accordingly, there is a need for impact modified poly (arylene sulfide) resin compositions which exhibit relatively low melt viscosities while also exhibiting desired levels of impact resistance and ductility at low temperatures.

SUMMARY OF THE INVENTION

The compositions comprise a low molecular weight poly (arylene sulfide) resin, a high molecular weight poly(arylene sulfide) resin, an impact modifier and additional optional components. The compositions unexpectedly exhibit the combined properties of relatively low melt viscosities and desired levels of impact resistance and ductility at low temperatures. The compositions are useful for making molded articles.

DETAILED DESCRIPTION OF THE INVENTION

The poly(arylene sulfide) resin (hereinafter referred to as PPS) used in the present invention is a polymer comprising at least 70 molar %, preferably at least 90 molar %, of recurring units of the structural formula (I):

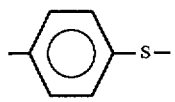

When the amount of recurring units of formula (I) is less than 70 molar %, the heat resistance is insufficient.

The remaining 30 molar % or less, preferably 10 molar % or less, of the recurring units of the PPS polymer can be those of the following structural formulae (II):

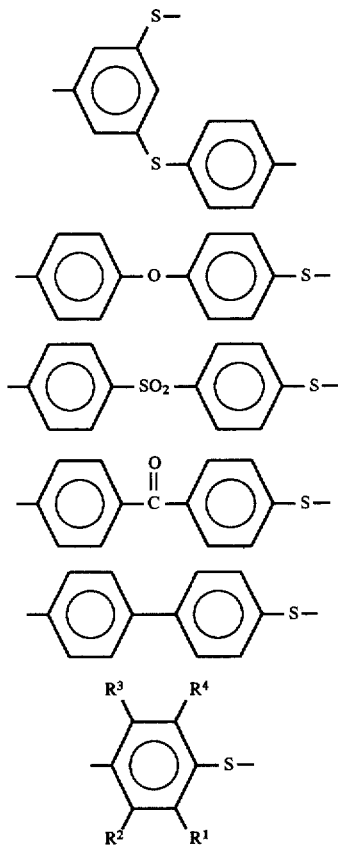

wherein $R^1$, $R^2$, $R^3$ and $R^4$ can be independently selected from the group consisting of hydrogen, halogen, alkyl, phenyl, alkoxy, aryloxy, nitro, amino, and carboxy groups.

The PPS may be unfunctionalized or functionalized. If the PPS is functionalized, the functional groups may include, but are not limited to, amino, carboxylic acid, metal carboxylate, disulfide, thio and metal thiolate groups. Some of the available methods to prepare PPS with functional groups can be found in U.S. Pat. No. 4,769,424, which is incorporated herein by reference. One method for incorporation of functional groups into PPS utilizes the incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

The PPS includes generally those having a relatively low molecular weight prepared by, for example, the process disclosed in the specification of U.S. Pat. No. 3,354,129 and those having a relatively high molecular weight such as the essentially linear polymers prepared by, for example, a process disclosed in the specification of U.S. Pat. No. 3,919,177, both of which U.S. Patents are incorporated herein by reference. The degree of polymerization of the polymers prepared by the process of U.S. Pat. No. 3,354,129 can be further increased by heating the same in an oxygen atmosphere or in the presence of a crosslinking agent such as a peroxide after the polymerization. Though PPS prepared by any process can be used in the present invention, an essentially linear polymer having a relatively high molecular weight prepared by the process of U.S. Pat. No. 3,919,177 is preferably used.

The low molecular weight PPS (hereinafter referred to as "LMWPPS"), is preferably a low molecular weight poly(p-phenylene sulfide) resin, and preferably has a number average molecular weight of between about 2,000 and about 10,000, more preferably between about 5,000 and about 9,000, and most preferably between about 7,000 and about 8,500. Additionally, the LMWPPS preferably has a weight average molecular weight of between about 2,000 and about 40,000, more preferably between about 20,000 and about 35,000, and most preferably between about 30,000 and about 34,000.

The high molecular weight PPS (hereinafter refered to as "HMWPPS") is preferably a high molecular weight poly(p-phenylene sulfide) resin, and preferably has a number average molecular weight of between about 11,000 and about 100,000, more preferably between about 25,000 and about 50,000, and most preferably between about 27,000 and about 35,000. Preferably the HMWPPS has a weight average molecular weight of between about 55,000 and about 150,000, more preferably between about 80,000 and about 120,000, and most preferably between about 85,000 and about 100,000.

Suitable impact modifiers include various elastomeric copolymers, examples of which are ethylene-propylene-diene polymers (EPDM's) that may be either unfunctionalized or functionalized with, for example, epoxy, anhydride, ortho-ester, oxazoline, sulfonate or phosphonate groups; carboxylated ethylene-propylene rubbers; polymerized cycloalkenes; block copolymers of alkenylaromatic compounds, such as for example styrene, with polymerizable olefins or dienes, such as for example butadiene, isoprene, chloroprene, ethylene, propylene and butylene; and core-shell polymers, including those containing a poly (alkyl acrylate) core attached to a polystyrene shell via interpenetrating network, and more fully disclosed in U.S. Pat. No. 4,681,915, which is incorporated herein by reference.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is preferable to remove or decrease the aliphatic unsaturation in the block copolymers by selective hydrogenation. The weight average molecular weight of the block copolymers are typically in the range of about 50,000–300,000. Block copolymers of this type are commercially available from Shell Chemical Company under the trademark KRATON, and include KRATON D1101, G1650, G1651, G1652 and G1702.

Preferably the compositions further comprise an epoxy functional α-olefin elastomer. The term α-olefin as used herein means ethylene, propylene, butene-1, etc. Among them, ethylene is preferred. The addition of an epoxy functional α-olefin elastomer provides the composition with enhanced physical properties. The epoxy functional α-olefinic elastomer is preferably an olefinic copolymer containing from about 60% to about 99.5% by weight of an α-olefin and from about 0.5% to about 40% by weight of a glycidyl ester of an α,β-unsaturated carboxylic acid.

The glycidyl esters of the α-β-unsaturated acids are compounds of the general formula (III):

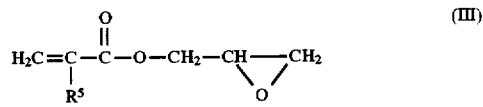

(III)

wherein $R^5$ represents a hydrogen atom or a lower alkyl group. Examples of the glycidyl esters of α,β-unsaturated acids include glycidyl acrylate, glycidyl methacrylate and glycidyl ethacrylate. The amount of the glycidyl ester of the α,β-unsaturated acid in the olefinic copolymer is from about 0.5% to about 40% by weight, preferably from about 3% to about 30% by weight; based on the weight of the total composition. When it is less than about 0.5% by weight, no intended effects can be obtained and, when it exceeds about 40% by weight, gelation occurs during melt-blending with PPS, resulting in degradation of the extrusion stability, moldability and mechanical properties of the product. Suitable epoxy functional α-olefin elastomers include: ethylene-glycidyl acrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional α-olefin elastomers are Bondfast® E from Sumitomo and Lotader® AX from Elf Atochem.

The preferred compositional ranges of the present invention, all of which are expressed as percentages by weight of the total composition, are as follows: the LMW-PPS is preferably present in the composition at a level of about 10% to about 85%, more preferably of about 50% to about 70%, and most preferably of about 55% to about 65%; the HMWPPS is preferably present in the composition at a level of about 10% to about 85%, more preferably of about 10% to about 30%, and most preferably of about 15% to about 25%; the impact modifier is preferably present at a level of about 2% to about 20%, more preferably of about 5% to about 15%, and most preferably of about 7% to about 10%. The epoxy functional alpha-olefin elastomer, if present, is preferably present in the composition at a level of about 2% to about 25%, more preferably of about 5% to about 20%, and most preferably of about 10% to about 15%.

Compositions of the present invention can also include effective amounts of at least one additive selected from the group consisting of flame retardants, drip retardants, dyes, pigments, colorants, stabilizers, antistatic agents, plasticizers and lubricants. These additives are known in the art, as are their effective levels and methods of incorporation. Effective amounts of the additives vary widely, but they are usually present in an amount from about 0.1% to about 50% by weight, based on the weight of the entire composition.

The preparation of the compositions of the present invention is normally achieved by blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition. The compositions of the present invention are useful for making molded articles such as housings for electrical connectors in under-the-hood automotive applications, and are useful for making various other molded articles.

It should also be clear that improved molded articles prepared from the compositions of the present invention represent an additional embodiment of this invention.

All patents and references cited herein are incorporated by reference.

The following examples are provided to illustrate some embodiments of the present invention. They are not intended to limit the invention in any aspect. All percentages are by weight based on the total weight of the entire composition, unless otherwise indicated.

EXAMPLES

The illustrative compositions of the Tables, all of which components are expressed as percentages by weight based on the total composition weight, were extruded on a Werner- Pfleiderer twin-screw extruder at a temperature of about 600° F. with a vacuum of 10–20 inches Hg applied to at least one vent port and were molded using a Toshiba injection molding machine using a barrel temperature of about 600° F. and a mold temperature of about 250° F. The molded samples of the compositions were subjected to measurement of notched Izod impact strength according to ASTM D256 (employing a sample size of 2.5 inch by 0.5 inch by 0.125 inch), Dynatup (energy to fracture falling dart test) strength according to ASTM D3763 (using 4 inch diameter by 0.125 inch disks), flexural modulus and flexural strength according to ASTM D790 (employing a samples size of 6 inch by 0.5 inch by 0.25 inch), heat deflection under loads of 66 and 264 psi according to ASTM D648 (employing a sample size of 6 inch by 0.5 inch by 0.25 inch) and tensile yield and tensile elongation at break according to ASTM D638. The viscosities (MV) were measured under the described conditions using an Instron capillary rheometer.

The PPS used in the examples was poly(p-phenylene sulfide) resin. The LMTVPPS was commercially available from Hoechst Celanese sold under the trademark FORTRON W203 (Mn=8400, Mw=3300), the HMWPPS1 was commercially available from Hoechst Celanese sold under the trademark FORTRON W214 (Mn=12,000, Mw=59,000), and the HMWPPS2 was also commercially available from Hoechst Celanese sold under the trademark FORTRON W300 (Mn=27500, Mw=90000). The melt flow indices of LMWPPS and HMWPPS were determined by ASTMD D1238, at 300° C. under a load of 2.16 kilogram (shear stress of 19400 pascals), and had the corresponding values of 378 and 12 gram/10 minutes. The epoxy functional α-olefin elastomer (EAO) was a polyethylene-co-glycidyl methacrylate copolymer sold under the trademark Bondfast® E. The impact modifier (IM) was a styrene-(ethylene-butylene)-styrene triblock copolymer sold under the trademark Kraton® G1651.

TABLE 1

| Property | BLENDS | | | | |
|---|---|---|---|---|---|
| | A | B | C | D | E |
| LMWPPS (wt %) | 80 | 60 | 40 | 20 | 0 |
| HMWPPS2 (wt %) | 0 | 20 | 40 | 60 | 80 |
| EAO (wt %) | 12 | 12 | 12 | 12 | 12 |
| IM (wt %) | 8 | 8 | 8 | 8 | 8 |
| MV @ 300° C., 100s$^{-1}$, poise | 1900 | 6900 | 12300 | 20600 | 23800 |
| MV @ 300° C., 1800s$^{-1}$, poise | 1090 | 2100 | 3300 | 5040 | 5841 |
| HDT @ 264 psi, °F. | 208 | 211 | 210 | 209 | 208 |
| Room Temp. NII, ft-lb/in | 1.5 | 12.6 | 13.6 | 14.5 | 13.5 |
| −20° F./NII, ft/lb./in | 1.2 | 4.2 | 5.3 | 4.2 | 3.0 |
| Room Temp. Dynatup Energy*, ft-lb | 30B | 33D | 35D | 34D | 27D |
| −20° F. Dynatup Energy, ft-lb | 5B | 19D | 28D | 29D | 3B |
| Flex Modulus, kpsi | 276 | 275 | 284 | 298 | 295 |
| Flex Strength, psi | 9950 | 9930 | 10000 | 10600 | 10400 |
| Tensile Elongation at break, % | 18 | 65 | 51 | 63 | 71 |
| Tensile Yield Strength, psi | 6490 | 6460 | 6830 | 7169 | 7000 |
| Tensile Ultimate Strength, psi | 6510 | 6160 | 6290 | 6560 | 6300 |

*D and B refer to Ductile and Brittle failure modes, respectively.

Table 1 illustrates compositions that utilize both the EAO and IM with PPS. Physical property data of comparative blends made from the compositions of Examples A and E, each utilizing only a single molecular weight PPS, show the deficiency in low temperature impact strength, as represented by −20° F. Dynatup impact strength. Comparison of the comparative blends Examples A and E to the physical property data of blends made from the compositions of Examples B, C and D, each of which utilizes a mixture of LMWPPS and HMWPPS2, illustrates the unexpected results of superior low temperature impact strength and ductility, again represented as −20° F. Dynatup impact strength, of the present invention. Other physical properties are maintained in the compositions made with the mixture of PPS resins.

TABLE 2

| Property | BLENDS | | | | |
|---|---|---|---|---|---|
| | F | G | H | I | J |
| LMWPPS (wt %) | 90 | 67.5 | 45 | 22.5 | 0 |
| HMWPPS2 (wt %) | 0 | 22.5 | 45 | 67.5 | 90 |
| EAO (wt %) | 6 | 6 | 6 | 6 | 6 |
| IM (wt %) | 4 | 4 | 4 | 4 | 4 |
| MVI, 300° C., 2.16 kg, g/10' | 154 | 40 | 13 | 4 | 1 |
| HDT @ 264 psi, °F. | 214 | 222 | 218 | 212 | 212 |
| Room Temp. NII, ft-lb/in | 0.7 | 2 | 6.3 | 6.6 | 15.8 |
| −20° F./NII, ft/lb./in | 0.8 | 1.4 | 2.6 | 2.6 | 2.3 |
| Room Temp. Dynatup Energy*, ft-lb | 3 | 30 | 39 | 29 | 40 |
| −20° F. Dynatup Energy, ft-lb | 2 | 23 | 38 | 36 | 46 |
| Flex Modulus, Kpsi | 391 | 384 | 379 | 378 | 358 |
| Flex Strength, Kpsi | 14.2 | 14.3 | 14.3 | 14.0 | 13.0 |
| Tensile Elongation at break, % | 7 | 20 | 16 | 28 | 62 |
| Tensile Yield Strength, psi | 8742 | 8950 | 8829 | 8835 | 7431 |
| Tensile Ultimate Strength, psi | 8742 | 8053 | 7054 | 7103 | 5221 |

Table 2 further illustrates compositions that utilize both the EAO and IM with PPS and demonstrate the utility at a lower overall level of EAO and IM than utilized in the compositions of Table 1. As seen by these data, a better overall balance in physical property data is obtained by utilization of a high molecular weight PPS and a low molecular weight PPS than with either PPS alone.

TABLE 3

| Property | \multicolumn{5}{c}{BLENDS} | | | | |
|---|---|---|---|---|---|
| | K | L | M | N | O |
| LMWPPS (wt %) | 80 | 60 | 40 | 20 | 0 |
| HMWPPS2 (wt %) | 0 | 20 | 40 | 60 | 80 |
| EAO (wt %) | 20 | 20 | 20 | 20 | 20 |
| MV @ 300° C., 100s$^{-1}$, poise | 1685 | 3668 | 10787 | 15945 | 28937 |
| MV @ 300° C., 1800s$^{-1}$, poise | 641 | 1271 | 2919 | 4827 | 6765 |
| HDT @ 264 psi, °F. | 217 | 214 | 207 | 208 | 215 |
| Room Temp. NII, ft-lb/in | 2.35 | 9.88 | 12.21 | 12.67 | 11.48 |
| −20° F./NII, ft/lb./in | 1.71 | 2.37 | 3.63 | 6.7 | 8.64 |
| Room Temp. Dynatup Energy*, ft-lb | 15.5B | 22.3B | 27D | 31.1D | 32.4D |
| −20° F. Dynatup Energy, ft-lb | 1.5B | 29.3B | 17.1B | 34.8B | 35.2B |
| Flex Modulus, kpsi | 281 | 282 | 285 | 275 | 246 |
| Flex Strength, psi | 10400 | 10240 | 10270 | 9839 | 9274 |
| Tensile Elongation at break, % | 19 | 31 | 38 | 44 | 85 |
| Tensile Yield Strength, psi | 6800 | 7027 | 7091 | 7061 | 6040 |
| Tensile Ultimate Strength, psi | 6825 | 6385 | 6484 | 6353 | 5878 |

*D and B refer to Ductile and Brittle failure modes, respectively.

The data in Table 3 relates to samples made utilizing a single modifier, in these examples the epoxy functional α-olefin elastomer (EAO). Physical property data of comparative blends made from the compositions of Example K utilizing only a single molecular weight PPS, show the deficiency in low temperature impact strength, as represented by −20° F. Dynatup impact strength. Comparison of the comparative blends Examples K and O to the physical property data of blends made from the compositions of Examples L, M, and N, each of which utilizes a mixture of LMWPPS and HMWPPS2, illustrates the unexpected results of superior impact strength and flow of the present invention. Other physical properties are maintained in the compositions made with the mixture of PPS resins.

TABLE 4

| Property | \multicolumn{5}{c}{BLENDS} | | | | |
|---|---|---|---|---|---|
| | P | Q | R | S | T |
| LMWPPS (wt %) | 90 | 67.5 | 45 | 22.5 | 0 |
| HMWPPS2 (wt %) | 0 | 22.5 | 45 | 67.5 | 90 |
| EAO (wt %) | 10 | 10 | 10 | 10 | 10 |
| MVI, 300° C., 2.16 kg, g/10' | 147 | 33 | 9 | 3 | 1 |
| HDT @ 264 psi, °F. | 226 | 219 | 217 | 210 | 207 |
| Room Temp. NII, ft-lb/in | 1.0 | 1.4 | 2.3 | 10 | 11.7 |

TABLE 4-continued

| Property | \multicolumn{5}{c}{BLENDS} | | | | |
|---|---|---|---|---|---|
| | P | Q | R | S | T |
| −20° F./NII, ft/lb./in | 0.8 | 1.8 | 1.8 | 2.1 | 1.9 |
| Room Temp. Dynatup Energy*, ft-lb | 5 | 31 | 41 | 39 | 34 |
| −20° F. Dynatup Energy, ft-lb | 2 | 9 | 25 | 36 | 23 |
| Flex Modulus, kpsi | 403 | 386 | 375 | 366 | 341 |
| Flex Strength, kpsi | 15.1 | 14.4 | 14.0 | 13.6 | 12.6 |
| Tensile Elongation at break, % | 8 | 17 | 20 | 28 | 29 |
| Tensile Yield Strength, psi | 936 | 9714 | 9241 | 8613 | 7369 |
| Tensile Ultimate Strength, psi | 9386 | 8593 | 6996 | 6592 | 5458 |

The data in Table 4 relates to additional samples made utilizing a single modifier, in these examples the epoxy functional α-olefin elastomer (EAO). As seen by these data, a better overall balance in physical property data is obtained by utilization of a high molecular weight PPS and a low molecular weight PPS than with either PPS alone.

TABLE 5

| Property | \multicolumn{5}{c}{BLENDS} | | | | |
|---|---|---|---|---|---|
| | U | V | W | X | Y |
| LMWPPS (wt %) | 80 | 60 | 40 | 20 | 0 |
| HMWPPS2 (wt %) | 0 | 20 | 40 | 60 | 80 |
| IM (wt %) | 20 | 20 | 20 | 20 | 20 |
| MV @ 300° C., 100s$^{-1}$, poise | 2477 | 2222 | 2405 | 3932 | 4050 |
| MV @ 300° C., 1800s$^{-1}$, poise | 579 | 836 | 1190 | 1505 | 1780 |
| HDT @ 264 psi, °F. | 217 | 214 | 210 | 220 | 212 |
| Room Temp. NII, ft-lb/in | 0.67 | 1.12 | 1.5 | 1.83 | 2.76 |
| −20° F./NII, ft/lb./in | 0.66 | 0.89 | 0.96 | 1.1 | 1.05 |
| Room Temp. Dynatup Energy*, ft-lb | 1.4 | 10 | 13 | 35.3 | 31.1 |
| −20° F. Dynatup Energy, ft-lb | 1.2B | 2.5B | 1.3B | 3B | 23B |
| Flex Modulus, kpsi | 298 | 296 | 287 | 276 | 307 |
| Flex Strength, psi | 9550 | 9663 | 9522 | 9212 | 10410 |
| Tensile Elongation at break, % | 9.2 | 33.1 | 22.3 | 24 | 17.9 |
| Tensile Yield Strength, psi | 5762 | 6103 | 6036 | 5881 | 6634 |
| Tensile Ultimate Strength, psi | 5762 | 6311 | 6043 | 5600 | 5684 |

*D and B refer to Ductile and Brittle failure modes, respectively.

The data in Table 5 relates to samples made utilizing a single modifier, in these examples the styrene-(ethylene-butylene)-styrene triblock copolymer. Physical property data of comparative blend made from the composition of Examples U utilizing only a single molecular weight PPS, show the deficiency in impact strength, as represented by notched Izod. Comparison of the comparative blends Examples K and O to the physical property data of blends made from the compositions of Examples L, M and N, each of which utilizes a mixture of LMWPPS and HMWPPS2, illustrates the unexpected results of superior impact strength and flow of the present invention. Other physical properties are maintained in the compositions made with the mixture of PPS resins.

The data in Table 7 relates to samples made utilizing a single modifier, in these examples the epoxy functional α-olefin elastomer (EAO). Physical property data of comparative blends made from the composition of Example EE utilizing only a single molecular weight PPS, show the deficiency in low temperature impact strength, as represented by −20° F. Dynatup impact strength. Comparison of the comparative blends Examples EE and II to the physical property data of blends made from the compositions of Examples FF, GG, and HH, each of which utilizes a mixture of LMWPPS and HMWPPS1, illustrates the unexpected results of superior impact strength and flow of the present invention. Other physical properties are maintained in the compositions made with the mixture of PPS resins.

TABLE 6

| Property | BLENDS | | | | |
|---|---|---|---|---|---|
| | Z | AA | BB | CC | DD |
| LMWPPS (wt %) | 90 | 67.5 | 45 | 22.5 | 0 |
| HMWPPS2 (wt %) | 0 | 22.5 | 45 | 67.5 | 90 |
| IM (wt %) | 10 | 10 | 10 | 10 | 10 |
| MVI, 300° C., 2.16 kg, g/10' | 172 | 61 | 27 | 16 | 8 |
| HDT @ 264 psi, °F. | 232 | 215 | 211 | 208 | 212 |
| Room Temp. NII, ft-lb/in | 0.6 | 1.0 | 1.5 | 2.0 | 1.8 |
| −20° F./NII, ft/lb./in | 0.5 | 0.8 | 1.3 | 1.2 | 0.9 |
| Room Temp. Dynatup Energy*, ft-lb | 2 | 15 | 30 | 40 | 35 |
| −20° F. Dynatup Energy, ft-lb | 1 | 3 | 6 | 16 | 34 |
| Flex Modulus, Kpsi | 417 | 406 | 407 | 393 | 381 |
| Flex Strength, Kpsi | 14.1 | 14.6 | 14.7 | 14.0 | 13.5 |
| Tensile Elongation at break, % | 7 | 17 | 11 | 13 | 11 |
| Tensile Yield Strength, psi | 8688 | 9008 | 8870 | 8772 | 8269 |
| Tensile Ultimate Strength, psi | 8688 | 7688 | 7141 | 6853 | 6534 |

The data in Table 6 relates to samples made utilizing a single modifier, in these examples the styrene-(ethylene-butylene)-styrene triblock copolymer. As seen by these data, a better overall balance in physical property data is obtained by utilization of a high molecular weight PPS and a low molecular weight PPS than with either PPS alone.

TABLE 7

| Property | BLENDS | | | | |
|---|---|---|---|---|---|
| | EE | FF | GG | HH | II |
| LMWPPS (wt %) | 80 | 60 | 40 | 20 | 0 |
| HMWPPS1 (wt %) | 0 | 20 | 40 | 60 | 80 |
| EAO (wt %) | 20 | 20 | 20 | 20 | 20 |
| MV @ 300° C., 100s$^{-1}$, poise | 1685 | 4249 | 6243 | 11183 | 18690 |
| MV @ 300° C., 1800s$^{-1}$, poise | 641 | 1307 | 1853 | 3045 | 4711 |
| HDT @ 264 psi, °F. | 217 | 213 | 212 | 220 | 212 |
| Room Temp. NII, ft-lb/in | 2.35 | 3.45 | 9.94 | 11.8 | 13.24 |
| −20° F./NII, ft/lb./in | 1.71 | 1.76 | 2.57 | 5.22 | 6.11 |
| Room Temp. Dynatup Energy*, ft-lb | 15.5B | 32.5D | 35D | 31.9D | 36.5D |
| −20° F. Dynatup Energy, ft-lb | 1.5B | 25.2B | 36.9B | 28.5B | 38.7D |
| Flex Modulus, kpsi | 281 | 299 | 292 | 285 | 280 |
| Flex Strength, psi | 10360 | 11140 | 10940 | 10690 | 10430 |
| Tensile Elongation at break, % | 19 | 29.3 | 34 | 33.8 | 41.9 |
| Tensile Yield Strength, psi | 6800 | 7496 | 7341 | 7207 | 7184 |
| Tensile Ultimate Strength, psi | 6825 | 7142 | 6579 | 6668 | 6548 |

*D and B refer to Ductile and Brittle failure modes, respectively.

TABLE 8

| Property | JJ | KK | LL | MM | NN |
|---|---|---|---|---|---|
| LMWPPS (wt %) | 80 | 60 | 40 | 20 | 0 |
| HMWPPS1 (wt %) | 0 | 20 | 40 | 60 | 80 |
| IM (wt %) | 20 | 20 | 20 | 20 | 20 |
| MV @ 300° C., 100s$^{-1}$, poise | 2477 | 2245 | 1896 | 2406 | 3520 |
| MV @ 300° C., 1800s$^{-1}$, poise | 579 | 709 | 881 | 1111 | 1364 |
| HDT @ 264 psi, °F. | 217 | 215 | 208 | 220 | 217 |
| Room Temp. NII, ft-lb/in | 0.67 | 1.07 | 1.51 | 1.6 | 1.62 |
| −20° F./NII, ft/lb./in | 0.66 | 0.91 | 1.08 | 1.16 | 1.07 |
| Room Temp. Dynatup Energy*, ft-lb | 1.4B | 5.6B | 9.4B | 26.8B | 18.8B |
| −20° F. Dynatup Energy, ft-lb | 1.2B | 1.2B | 2.3B | 3.3B | 9.2B |
| Flex Modulus, kpsi | 298 | 295 | 293 | 295 | 290 |
| Flex Strength, psi | 9550 | 9662 | 9829 | 9959 | 9882 |
| Tensile Elongation at break, % | 9.2 | 26.2 | 38.7 | 50.5 | 34.4 |
| Tensile Yield Strength, psi | 5762 | 5285 | 5944 | 6079 | 6336 |
| Tensile Ultimate Strength, psi | 5762 | 5503 | 6215 | 6055 | 6064 |

*D and B refer to Ductile and Brittle failure modes, respectively.

The data in Table 5 relates to samples made utilizing a single modifier, in these examples the styrene-(ethylene-butylene)-styrene triblock copolymer. Physical property data of comparative blend made from the composition of Examples JJ utilizing only a single molecular weight PPS, show the deficiency in impact strength, as represented by notched Izod. Comparison of the comparative blends Examples JJ and NN to the physical property data of blends made from the compositions of Examples KK, LL, and MM, each of which utilizes a mixture of LMWPPS and HMWPPS1, illustrates the unexpected results of superior impact strength and flow of the present invention. Other physical properties are maintained in the compositions made with the mixture of PPS resins.

The compositions of the present invention may contain additional thermoplastic materials, but preferably are free of such additional thermoplastic materials. Thermoplastic materials which either may be added or may be absent from the present compositions include, for example, polyphenylene ethers, polyamides, polyimides, polyetherimides, polycarbonates, and polyesters.

What is claimed:

1. A composition comprising:
   (a) a low molecular weight poly(arylene sulfide) resin, wherein said low molecular weight poly(arylene sulfide) resin is present at a level of from about 10% to about 85% by weight based on the total weight of the composition, and wherein said low molecular weight poly(arylene sulfide) resin has a number average molecular weight of between about 2,000 and about 10,000;
   (b) a high molecular weight poly(arylene sulfide) resin, wherein said high molecular weight poly(arylene sulfide) resin is present at a level of between about 10% by weight and about 85% by weight percent based on the total weight of the composition, and wherein said high molecular weight poly(arylene sulfide) resin has a number average molecular weight of between about 11,000 and about 100,000; and
   (c) at least one impact modifier selected from the group consisting of:
      (i) a block copolymer of alkenyl aromatic compounds and dienes, wherein the block copolymer is a triblock copolymer comprising polystyrene endblocks and a selectively hydrogenated diene-derived midblock;
      (ii) an epoxy functional alpha-olefin elastomer comprising about 60% to about 99.5% by weight of an α-olefin and about 0.5% to about 40% by weight of a glycidyl ester of an α,β-unsaturated carboxylic acid; and
      (iii) a mixture of (i) and (ii);
   wherein said impact modifier is present at a level of from about 2% to about 20% by weight based on the total weight of the composition.

2. The composition as claimed in claim 1, wherein said composition consists essentially of said low molecular weight poly(arylene sulfide) resin, said high molecular weight poly(arylene sulfide) resin, and said epoxy functional alpha-olefin elastomer.

3. The composition as claimed in claim 1, wherein said composition consists essentially of said low molecular weight poly(arylene sulfide) resin, said high molecular weight poly(arylene sulfide) resin, and said block copolymer.

4. The composition of claim 1 further comprising at least one additive selected from the group consisting of flame retardants, drip retardants, dyes, pigments, colorants, stabilizers, antistatic agents, plasticizers and lubricants.

5. An article molded from the composition of claim 1, least one additive selected from the group consisting of flame retardants, drip retardants, dyes, pigments, colorants, stabilizers, anti-static agents, plasticizers, and lubricants.

6. A composition consisting essentially of:
   (a) a low molecular weight poly(arylene sulfide) resin, wherein said low molecular weight poly(arylene sulfide) resin is present at a level of from about 10% to about 85% by weight based on the total weight of the composition, and wherein said low molecular weight poly(arylene sulfide) resin has a number average molecular weight of between about 2,000 and about 10,000;
   (b) a high molecular weight poly(arylene sulfide) resin, wherein said high molecular weight poly(arylene sulfide) resin is present at a level of between about 10% by weight and about 85% by weight percent based on the total weight of the composition, and wherein said high molecular weight poly(arylene sulfide) resin has a number average molecular weight of between about 11,000 and about 100,000; and
   (c) at least one impact modifier selected from the group consisting of:

(i) a block copolymer of alkenyl aromatic compounds and dienes, wherein the block copolymer is a tri-block copolymer comprising polystyrene endblocks and a selectively hydrogenated diene-derived midblock;

(ii) an epoxy functional alpha-olefin elastomer comprising about 60% to about 99.5% by weight of an α-olefin and about 0.5% to about 40% by weight of a glycidyl ester of an α,β-unsaturated carboxylic acid; and (iii) a mixture of (i) and (ii);

wherein said impact modifier is present at a level of from about 2% to about 20% by weight based on the total weight of the composition.

7. An article molded from the composition of claim 6.

8. A composition consisting of:

(a) a low molecular weight poly(arylene sulfide) resin, wherein said low molecular weight poly(arylene sulfide) resin is present at a level of from about 10% to about 85% by weight based on the total weight of the composition, and wherein said low molecular weight poly(arylene sulfide) resin has a number average molecular weight of between about 2,000 and about 10,000;

(b) a high molecular weight poly(arylene sulfide) resin, wherein said high molecular weight poly(arylene sulfide) resin is present at a level of between about 10% by weight and about 85% by weight percent based on the total weight of the composition, and wherein said high molecular weight poly(arylene sulfide) resin has a number average molecular weight of between about 11,000 and about 100,000; and (c) at least one impact modifier selected from the group consisting of:

(i) a block copolymer of alkenyl aromatic compounds and dienes, wherein the block copolymer is a tri-block copolymer comprising polystyrene endblocks and a selectively hydrogenated diene-derived midblock;

(ii) an epoxy functional alpha-olefin elastomer comprising about 60% to about 99.5% by weight of an α-olefin and about 0.5% to about 40% by weight of a glycidyl ester of an α,β-unsaturated carboxylic acid; and (iii) a mixture of (i) and (ii);

wherein said impact modifier is present at a level of from about 2% to about 20% by weight based on the total weight of the composition.

* * * * *